May 10, 1927. 1,628,101
W. A. BALDWIN
PINEAPPLE STUMP SHREDDER AND HARROW
Filed March 29, 1923 2 Sheets-Sheet 1
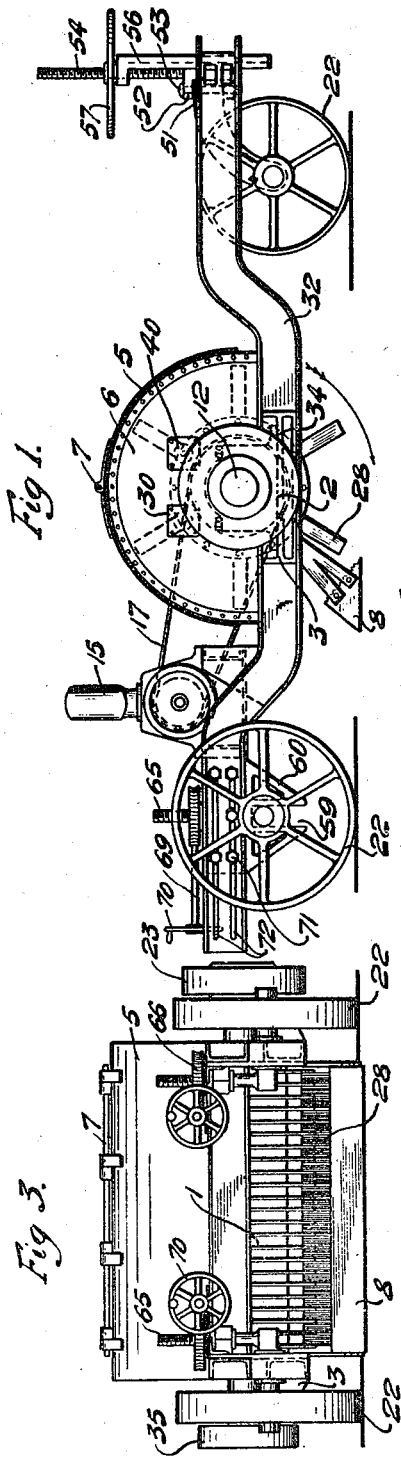
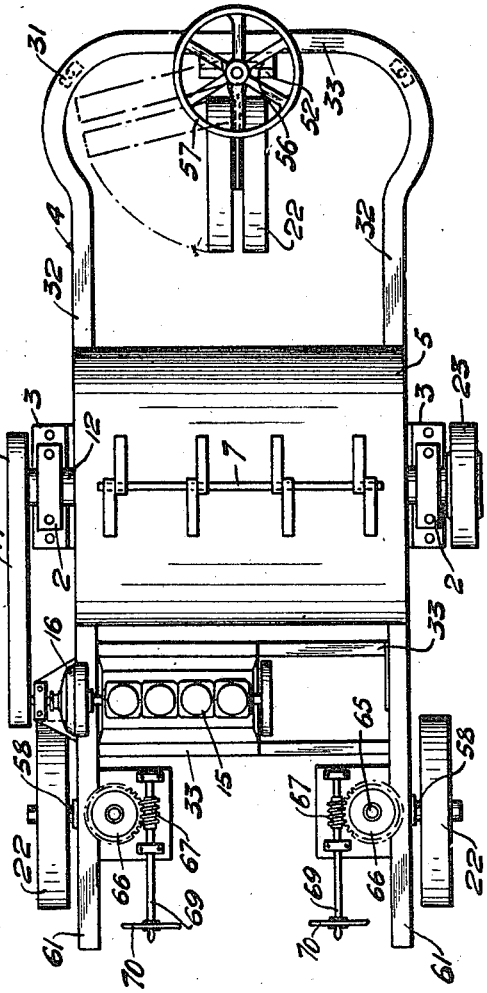
Inventor
William A. Baldwin
By
Attorney

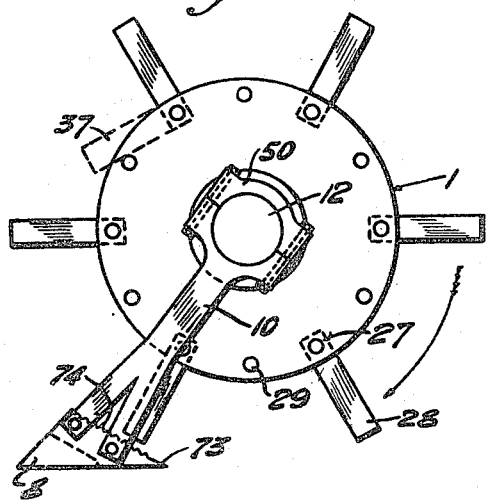
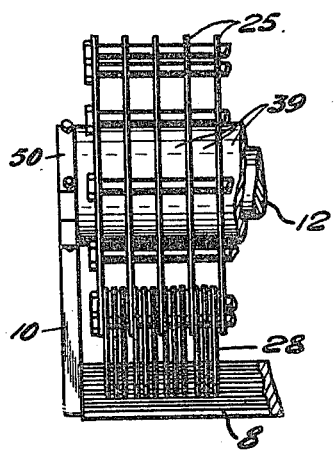
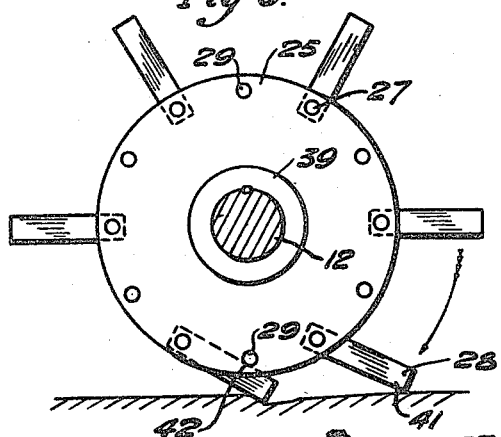
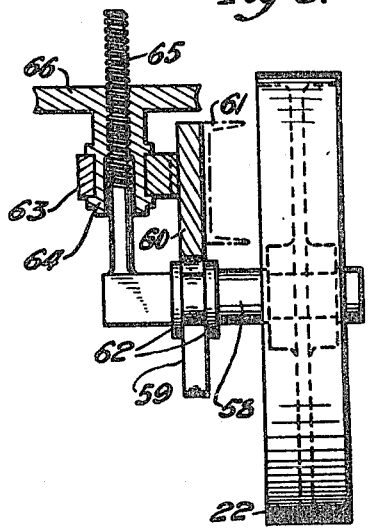
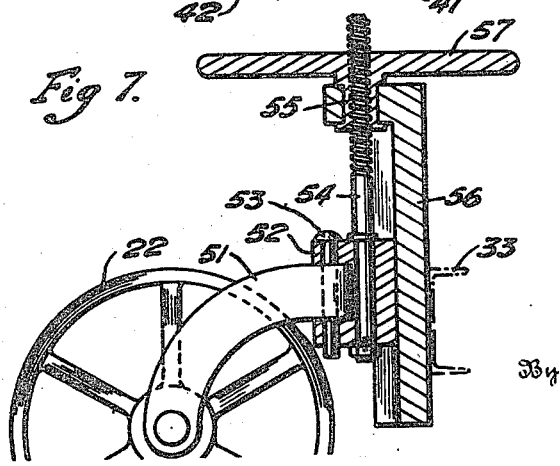

Patented May 10, 1927.

1,628,101

UNITED STATES PATENT OFFICE.

WILLIAM A. BALDWIN, OF HAIKU, TERRITORY OF HAWAII.

PINEAPPLE-STUMP SHREDDER AND HARROW.

Application filed March 29, 1923. Serial No. 628,612.

This invention relates to a power-driven implement or machine, the object of which is to provide a means for tearing, breaking, shredding, pulverizing and pulping various forms of stubble and plant growth in cultivated or non-cultivated fields. This machine is especially designed to tear, break, and shred pineapple plant growth of any age or size, and to tear, break, shred, pulverize and pulp various other forms of plant growth such as grasses, weeds, cover crops, etc., and to tear, break, and shred stubble, field trash, sugar cane field trash, etc., and to pulverize soil and clods, thereby serving also as a harrow.

It having been scientifically demonstrated and proven and generally accepted in agriculture that it is of great value and highly desirable that plant growth and residual plant growth be returned to the soil to provide humus and other desirable elements for renovating and to guard the soil from depletion of these valuable elements, it is the object of this invention to greatly assist in scientific and approved up-to-date agriculture, in that by tearing, breaking, shredding, pulverizing and pulping the aforementioned forms of plant growth and plant trash, so that the same may therefore be readily plowed under and be caused to more quickly decay, thereby hastening and greatly improving the agricultural process, especially in the case of a plant such as the pineapple which is tough, tenacious of life and difficult to cause to decay when plowed under.

This machine is designed to be and it is intended that it shall be drawn or pushed over the field, meeting the plant growth, etc., as same stands or lies in the field, the tearing, breaking, shredding, etc., being done by the machine as it travels continuously back and forth across the field drawn or pushed by a tractor or other tractive power.

It is also an object of the invention to provide an implement that will harrow plowed land rapidly and well, and that with but once travelling over a lumpy plowed field, will thrash the soil into a fineness heretofore never accomplished by any power drawn or propelled agricultural harrow.

The above and other objects in view will appear as the nature of the invention is better understood. The same consists in the novel arrangement of parts which will hereinafter be fully described and particularly pointed out in the claims.

In the accompanying drawings attached hereto and made a part hereof has been illustrated a single preferred form of the invention, it being, however, understood that the invention is not necessarily limited to the precise structural details therein exhibited, but that changes, alterations and modifications within the scope of the claims may be resorted to when desired.

In the drawings:—

Figure 1 is a side elevation of my improved implement.

Figure 2 is a plan view of the same.

Figure 3 is an end elevation.

Figure 4 is a view in elevation of a part of the rotor carrying the hammer bars, also showing the cutter bar.

Figure 5 is an end elevation of the rotor showing the cutter bar and the connecting rod by which it is suspended.

Figure 6 is an end elevation of the rotor showing some of the hammer bars in the radially extended position assumed through said centrifugal force, and certain of said bars deflected in the cutting operation.

Figures 7 and 8 show, respectively, detail views partly in section, of the forward and rearward vertical adjustment means for the vehicle wheels.

Referring now in detail to the several figures, the numeral 4 represents a rectangular frame constructed of opposite longitudinal channel irons 32 connected transversely by the cross members 33. The longitudinal channel irons are preferably arranged with their flanges facing outwardly. A pair of brackets 3 project from the opposite sides of the frame, being secured within the channels of said channel irons as shown in Figure 1 and being formed with horizontal webs 34 which afford support for the lower ends of bearing blocks 2, said bearing blocks preferably projecting outwardly from the longitudinal frame members as shown in Figure 2. A shaft 12 is journalled in said bearing blocks and carries a rotor 1 to which are attached the ground-engaging hammer bars 28 as will presently be more minutely described. On one end of the shaft 12 is the fly wheel 23, and on the other end a pulley 35 by means of which the rotor is driven through the silent chain or belt 17 from a source of power 15 which in the present instance consists of an internal combustion engine. A clutch 16 furnishes means by which the rotor may be driven or stopped at will.

The frame 4 is supported by the vehicle wheels 22, of which there are two rearwardly arranged at opposite sides of the frame and two centrally located at the forward end of the implement and carried by a bracket 51 which is pivotally connected to the block 52 by means of a pin 54, the front wheel acting as a castor when the implement is drawn by a tractor or other source of locomotion. The front and rear vehicle wheels are provided with means for effecting vertical adjustment so as to raise or lower the frame 4 with respect to the ground in order to control the depth of cut of the hammer bars 28. These adjustment means are quite similar and are shown in detail in Figures 7 and 8. Referring to the vertical adjustment of the fore wheels a screw 54 is secured to the block 52 and passes through a threaded thimble 55 rotatably mounted in the laterally off-set portion of a slide 56 which is secured to the front transverse frame member 33. The thimble 55 is flanged above and below the off-set portion of the guide 56 so as to prevent longitudinal movement of said thimble relative to said off-set portion. A hand wheel 57 is secured to or made integral with the thimble 55, by means of which the latter is turned. Upon operating the hand wheel the screw 54 rises or falls, carrying with it the block 52 and the vehicle wheel 22, relatively raising or lowering the frame member 33 with respect to the ground.

Adverting now to the rear vehicle wheels, each is mounted upon a stub spindle 58 having a range of vertical movement through a slide 59 formed in a bracket 60 which is preferably carried by extensions 61 at the rear of the longitudinal frame members 32. The stub spindle 58 is preferably flanged on both sides of the bracket 60 with flanges 62, which prevent relative endwise movement between said stub spindle and the bracket. The bracket 60 is formed with an off-set portion 63 similar to the off-set part of the guide 56 above described, in which is rotatably mounted a thimble 64 so constructed as to prevent relative endwise movement between itself and the off-set portion of said bracket. Said thimble threadedly engages a screw 65 which is secured in any suitable manner to the inner end of the stub spindle, and a worm wheel 66 is secured to or formed integral with said thimble. The worm wheel 66 is operated by a worm 67 carried at the end of an operating rod 69 the latter being provided at its outer end with a hand wheel 70. The bracket 60 is capable also of longitudinal adjustment by means of bolts 71 secured to said bracket and which pass through longitudinal slots 72 in the rear extension 61 of the longitudinal frame members, the object of which adjustment is to vary the length of wheel base of the implement.

The rotor 1 includes a plurality of disks 25 keyed upon the shaft 12 and spaced apart by means of the cylindrical spacing plates 39. Said disks are provided with peripheral rows of registering apertures through which the rods 27 and 29 are introduced. These rods are preferably formed with bolt heads at one end and furnished with nuts at the other so that they may be removed from the rotor when desired. The hammer bars 28 are freely suspended in the spaces between adjacent disks, and arrange themselves radially with respect to said rotor by centrifugal force, as shown in Figures 5 and 6, when the device is in operation, but which may assume a position of repose against the alternate unoccupied rods as shown at 37 in dotted lines in Figure 5. If for any reason one of the hammer bars should become bent or broken in use its removal is readily effected by withdrawing the rod 27 upon which it is mounted. A pair of connecting rods 10 are journally mounted upon the shaft 12 adjacent the ends of the rotor 1 and carry at their lower ends the transverse cutter bar 8. The latter preferably has the form of a triangular prism presenting a straight cutting edge 73 forwardly to the ground, the surface which inclines backwardly from said edge being longitudinally corrugated as shown at 74 over which the soil and comminuted vegetable matter travels after having been initially pulverized by the hammer bars 28 to be more thoroughly broken and finely worked by engagement with said corrugations. The connecting rods 10 are of such length that they assume an inclined position when the cutter bar is in contact with the ground, as shown in Figure 1, the angle of inclination being carried by adjusting the height of the frame 4 above the ground. The connecting rods are provided with the detachable caps 50, permitting their ready removal from the implement when necessary, the latter being operable, if desired, with the rotor alone.

The rotor 1 is enclosed, above the frame 4, within a hood comprising the side members 6, and the cover members 5 which are hingedly mounted as at 7 so that either, or both, may be raised to give access to the rotor. One of the side members 6 is provided with hand holes 40 which are normally closed by the detachable cover plates 30, said hand holes being arranged opposite the ends of the rods 27 and 29, rendering the latter accessible for removal or replacement.

The operation of my improved machine for shredding pineapple stumps and harrowing land may be readily understood from an inspection of Figure 6 in which it will be seen that the rows of hammer bars successively strike the ground violent blows, as shown at 41, cutting through or pulverizing the clod or clods struck and cutting or shredding any vegetable matter which comes in their way, the same being dragged beneath the surface of the ground by the travel of said hammer bars. In shallow harrowing the force of this blow is sufficient to drive the hammer bars through the ground without material deflection, but in deep harrowing, the resistance of the ground may deflect the hammer bars until they rest against the alternate rods 29, as shown at 42 in Figure 6, after which the cutting action becomes positive. When the hammer bars emerge from the ground they immediately spring out by said centrifugal force to a radial position. The yielding nature of the hammer bar when it makes contact with the ground prevents jamming of the implement should the hammer bars strike hard substances such as stones. This makes it possible to use a large number of hammer bars spaced a minimum distance apart and driven with a moderate amount of power. The relative movement of the inner portions of the hammer bars between the disks 25 prevents the clogging of the disks with mud or vegetable matter and assures that the hammer bars will always be in a freely oscillatable condition. The implement is designed to be attached to a tractor or other source of power, for which purpose the eyes 31 are provided, and when so drawn the cutter bar 8 supplements the action of the hammer bars by cutting the earth in a direction at right angles to the planes of the cuts of the hammer bars. It is apparent that swinging knives or other centrifugally actuated tools may be substituted for the bars when desired, without transcending the scope of the invention.

I consider that my invention resides primarily in the broad aspects hereinbefore set forth, and only secondarily in the details of construction and arrangement, wherefore, I do not restrict myself to the particular construction here disclosed, but only by the terms of the claims and the state of the prior art.

I claim—

1. In a device of the class described, a vehicle, a shaft carried thereby, spaced disks keyed to said shaft, a plurality of rods arranged through registering apertures in said disks, vegetable-matter shredding and harrowing elements pivotally carried by alternate rods and movable between said disks, said elements being freely suspended in unbalanced relation to engage the soil by centrifugal force when operating, the other alternate rods functioning as stops to limit the deflection of said elements through contact with the soil.

2. In a device of the class described, a frame, a rotor carried thereby comprising a shaft journally supported upon said frame, a plurality of spaced disks keyed to said shaft, a plurality of removable rods peripherally arranged and passing through registering apertures in said disks, vegetable-matter shredding and harrowing elements pivotally mounted upon said rods and movable between said disks, said elements being freely suspended in unbalanced relation to engage the soil by centrifugal force, when operating, a hood enclosing the circumferential end portions of said rotor above said frame, said hood having closure equipped apertures in position to be alined with said rods for giving access to said rods.

3. In a device of the class described, a vehicle supported frame, a rotor comprising a shaft journally supported by said frame, a plurality of spaced disks keyed to said shaft, a plurality of rods peripherally arranged with respect to said disks and passing through registering apertures in said disks, vegetable-matter shredding and harrowing means pivotally carried by said rods and movable between said disks, said means being freely suspended in unbalanced relation to engage the soil by centrifugal force, when operating, connecting rods freely carried by said shaft adjacent the ends of said rotor and a soil-engaging cutter bar journalled in the lower ends of said connecting rods, and provided with cutting elements.

4. In a device of the class described, a vehicle supported frame, a rotor, vegetable-matter shredding and harrowing means carried thereby and maintained in position to cut beneath the surface of the soil by centrifugal force, a ground engaging cutter bar swingably supported by said frame in a normal inclined position to the ground, said frame being vertically adjustable to determine the depth of cut of said shredding and harrowing means and the angle of inclination of said cutter bar.

5. In a device of the class described, a vehicle supported frame, a rotor, vegetable-matter shredding and harrowing means carried thereby and maintained in position to cut beneath the surface of the soil by centrifugal force, a ground engaging cutter bar pivotally carried by said frame coaxial with said rotor and normally engaging the ground in an inclined position, said frame being vertically adjustable to determine the cut of said shredding and harrowing means and the angle of inclination of said cutter bar.

In testimony whereof, I have hereunto signed my name to this specification.

WILLIAM A. BALDWIN.